United States Patent
Asthana et al.

(10) Patent No.: US 10,990,940 B1
(45) Date of Patent: Apr. 27, 2021

(54) SERVER VALIDATION OF WEBSITE SCRAPED DATA

(71) Applicants: Prashant Asthana, Bangalore (IN); Bipul Kumar, Bangalore (IN)

(72) Inventors: Prashant Asthana, Bangalore (IN); Bipul Kumar, Bangalore (IN)

(73) Assignee: Intuit Inc., Mountain View, CA (US)

( * ) Notice: Subject to any disclaimer, the term of this patent is extended or adjusted under 35 U.S.C. 154(b) by 479 days.

(21) Appl. No.: 16/034,909

(22) Filed: Jul. 13, 2018

(51) Int. Cl.
*G06Q 20/10* (2012.01)
*G06F 8/65* (2018.01)
*H04L 29/08* (2006.01)

(52) U.S. Cl.
CPC ............ *G06Q 20/108* (2013.01); *G06F 8/65* (2013.01); *H04L 67/12* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 8,538,827 | B1* | 9/2013 | Dryer | G06Q 30/00 705/26.1 |
| 10,108,432 | B1* | 10/2018 | Subbiah | G06Q 20/108 |
| 10,607,300 | B1* | 3/2020 | Lesner | H04L 51/14 |
| 2006/0085478 | A1* | 4/2006 | Landau | H04L 67/02 |
| 2014/0351091 | A1* | 11/2014 | He | G06Q 30/0625 705/26.62 |
| 2017/0359387 | A1* | 12/2017 | Barday | H04L 63/04 |

* cited by examiner

*Primary Examiner* — Joshua D Taylor
*Assistant Examiner* — Terrika Peterson
(74) *Attorney, Agent, or Firm* — Ferguson Braswell Fraser Kubasta PC

(57) ABSTRACT

A method that involves establishing a network connection with a plurality of servers executing at least one web application; executing, via the network connection, a set of computer executable scraping instructions on the at least one web application to obtain a set of scraped data; receiving a plurality of electronic messages transmitted via a network; generating a first set of records from the set of scraped data; generating a second set of records from the plurality of electronic messages; validating the set of computer executable scraping instructions by locating a record in the second set of records that identifies a transaction missing in the first set of records to obtain a validation result; and generating, based on the validation result, an alert to update the set of computer executable scraping instructions.

20 Claims, 11 Drawing Sheets

SERVER VALIDATION OF WEBSITE SCRAPED DATA

BACKGROUND

Websites provide a wealth of data that can be accessed by users. Additional processing and analysis of the data provided by the websites is provided by servers that scrape the data from websites. The scraping is performed by scripts that can be uniquely tailored to individual websites.

When websites for particular scripts change, the scripts may no longer function properly. A challenge is to identify when scripts need to be updated after changes are made to a website.

SUMMARY

In general, in one or more aspects, the invention relates to a method that involves establishing a network connection with a plurality of servers executing at least one web application; executing, via the network connection, a set of computer executable scraping instructions on the at least one web application to obtain a set of scraped data; receiving a plurality of electronic messages transmitted via a network; generating a first set of records from the set of scraped data; generating a second set of records from the plurality of electronic messages; validating the set of computer executable scraping instructions by locating a record in the second set of records that identifies a transaction missing in the first set of records to obtain a validation result; and generating, based on the validation result, an alert to update the set of computer executable scraping instructions.

In general, in one or more aspects, the invention relates to a system that comprises: a computer processor; a memory; a set of instructions in the memory that when executed by the computer processor cause the computer processor to perform the steps of: establishing a network connection with a plurality of servers executing at least one web application; executing, via the network connection, a set of computer executable scraping instructions on the at least one web application to obtain a set of scraped data; receiving a plurality of electronic messages transmitted via a network; generating a first set of records from the set of scraped data; generating a second set of records from the plurality of electronic messages; validating the set of computer executable scraping instructions by locating a record in the second set of records that identifies a transaction missing in the first set of records to obtain a validation result; and generating, based on the validation result, an alert to update the set of computer executable scraping instructions.

In general, in one or more aspects, the invention relates to a non-transitory computer readable medium that comprises computer readable program code for: establishing a network connection with a plurality of servers executing at least one web application; executing, via the network connection, a set of computer executable scraping instructions on the at least one web application to obtain a set of scraped data; receiving a plurality of electronic messages transmitted via a network; generating a first set of records from the set of scraped data; generating a second set of records from the plurality of electronic messages; validating the set of computer executable scraping instructions by locating a record in the second set of records that identifies a transaction missing in the first set of records to obtain a validation result; and generating, based on the validation result, an alert to update the set of computer executable scraping instructions.

Other aspects of the invention will be apparent from the following description and the appended claims.

DETAILED DESCRIPTION

Figure 1:
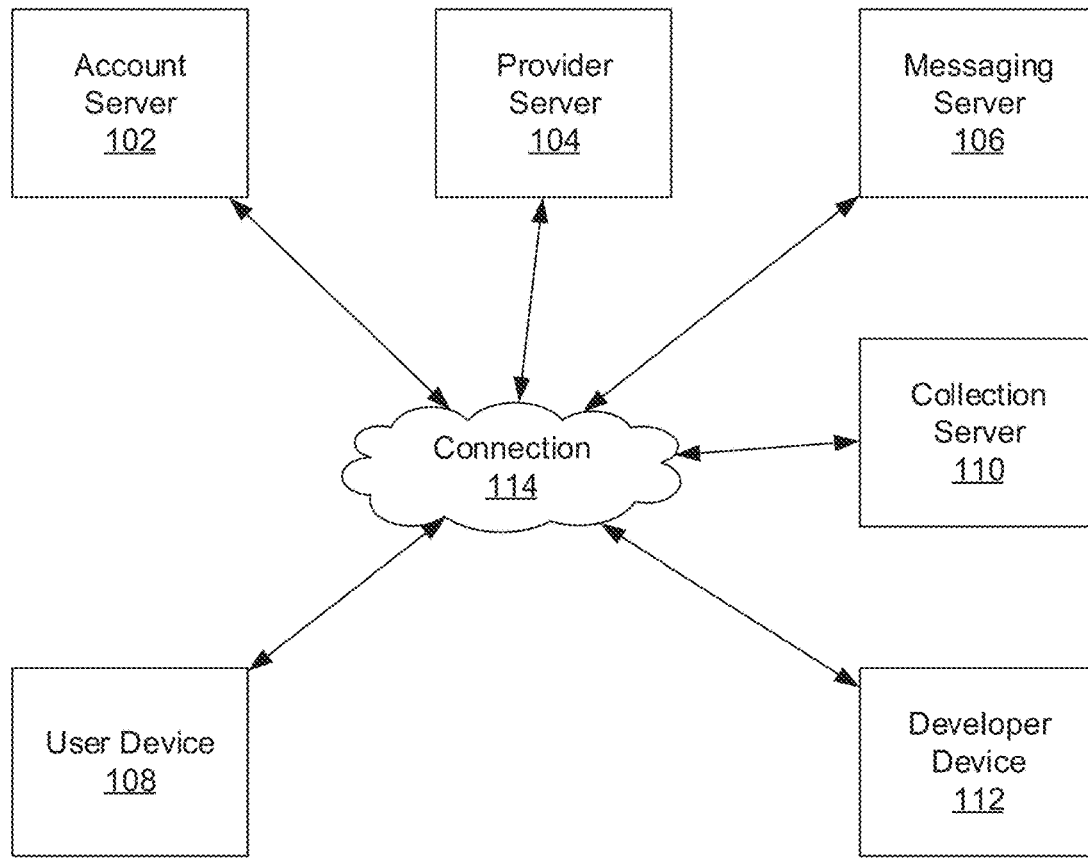
FIG. 1 shows a system in accordance with one or more embodiments of the present disclosure.

Specific embodiments of the disclosure will now be described in detail with reference to the accompanying figures. Like elements in the various figures are denoted by like reference numerals for consistency.

In the following detailed description of embodiments, numerous specific details are set forth in order to provide a more thorough understanding of the disclosure. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention allow for identifying scraping scripts that need to be updated. The identification is performed by comparing records of transactions generated from the scraping scripts with records of transactions generated from messages. Technological problems of prior systems and methods include the inability to determine when scraping scripts no longer work and need to be updated. When scripts no longer work, the programs and applications that dependent on the information from the scripts can no longer function. One or more embodiments in accordance with the present disclosure provide a technological solution that determines whether a script is working based on a first set of records generated from the script and a second set of records based on additional messages transmitted to a customer. Using records from two different types of sources allows for the identification of when the scripts are no longer working.

FIG. 1 shows a diagram of a system (100) in accordance with one or more embodiments of the invention. The various components of the system (100) may correspond to the computing system shown in FIGS. 9A and 9B. In particular, the type, hardware, and computer readable medium for the various components of the system (100) is presented in reference to FIGS. 9A and 9B. FIG. 1 shows a component diagram of the system (100). The system (100) includes an account server (102), a provider server (104), a messaging server (106), a user device (108), a collection server (110), and a developer device (112) that are interconnected with the connection (114). In one or more embodiments, one or more of the components shown in FIG. 1 may be omitted, repeated, and/or altered as shown from FIG. 1. Accordingly, the scope of the present disclosure should not be considered limited to the specific arrangement of components shown in FIG. 1.

The account server (102) is one or more servers that store and control access to account information. As discussed further below, the account server (102) can include a web application with website for a user and third parties to access the account information. The account server (102) generates and transmits messages related to the account information and based on a set of messaging preferences set by the user of the account. By way of an example, the account server (102) is operated by a financial institution, such as a bank or stock broker, to track and maintain financial accounts, such as checking accounts, debit card accounts, credit card accounts, savings accounts, stock portfolio accounts, etc. In one or more embodiments, the account server (102) is operated by a web services provider to track access to web applications and services.

In one or more embodiments, account information includes a set of records where each record identifies and describes a transaction with transaction data. Types of transactions include financial debit and credit transactions, including the purchase of a product or service from the provider server (104) with the user device (108), which are each described further below. In one or more embodiments, transaction data includes values for one or more of a transaction type, a transaction amount, a transaction description, a transaction date, and a transaction balance.

Additional types of transactions include network events, such as log-on information, access time information, and web application access information. The log-on information includes metadata that describes when the user device (108) logs into and out of the system. The access time information includes metadata that describes how long the user device (108) accesses the system (100). The web application access information includes metadata that describes which web applications are accessed by the user device (108).

The provider server (104) is operated by a provider to provide a product (e.g., good and/or service) that can be utilized by a user of the user device (108). For example, the provider may be a vendor or distributor of the product. The account information generated by the account server (102) is based on the product provided by the provider server (104). The provider server may also generate messages related to the product(s) that are provided.

In one or more embodiments, the provider server (102) is operated by a business that sells goods and services with an electronic sales transaction between the user device (108) and the provider server (104). The sales transaction can be funded by a financial transaction between the provider server (104) and the account server (102). The financial transaction debits or credits an account of the user of the user device (108) that is maintained by the account server (102). The provider server (102) generates and transmits messages based on transactions, such as sales transactions.

In one or more embodiments, the provider server (102) is operated by a web services provider. The user accesses the web services and applications hosted by the provider server (102) with the user device (108). Interaction with the provider server (102) with the user device (108) is recorded as web service transactions that are maintained with the account server (102).

The messaging server (106) transmits and receives messages between other components of the system (100). In one or more embodiments, messaging server operates in accordance with one or more protocols for passing messages in the form of text messages, SMS messages, MMS messages, email, instant messages, etc. Each message includes an address and a body. The address identifies the sender of the message and can be one or more of a phone number, an email address, an instant message address, etc. The body includes the text of the message with a set of symbols, numbers, characters, emojis, etc. In one or more embodiments, a message includes a set of entities that include metadata that describe a transaction.

The user device (108) is operated by a user to interact with the system (100). The interactions may involve generating network events and performing transactions. The user has an account that is maintained by the account server (102) and transacts with the provider that operates the provider server (104). The transactions between the user and the provider can be performed with the user device (108) and the provider server (104). These transactions generated by the user are recorded in the account maintained by the account server.

The collection server (110) scrapes account information from the account server (102) and obtains messages related to the account information. The collection server (110) validates the scraping scripts used to scrape the account information against the messages that were obtained.

The developer device (112) is operated by a developer to interact with the system (100). The developer device (112) allows for the presentation of alerts generated based on the validation of the scraping scripts. In one or more embodiments, the developer is an individual, group of individuals, and/or entity that creates and/or updates the scripts. The developer can review the alerts generated by the system (100) regarding the scraping scripts and can generate updates for the scraping scripts that are not automatically generated by the system (100).

The connection (114) is a set of hardware and/or software that connects various devices. The connection may include on or more wired or wireless links. An example of a connection is a network, discussed below in reference to FIGS. 9A and 9B.

Figure 2:
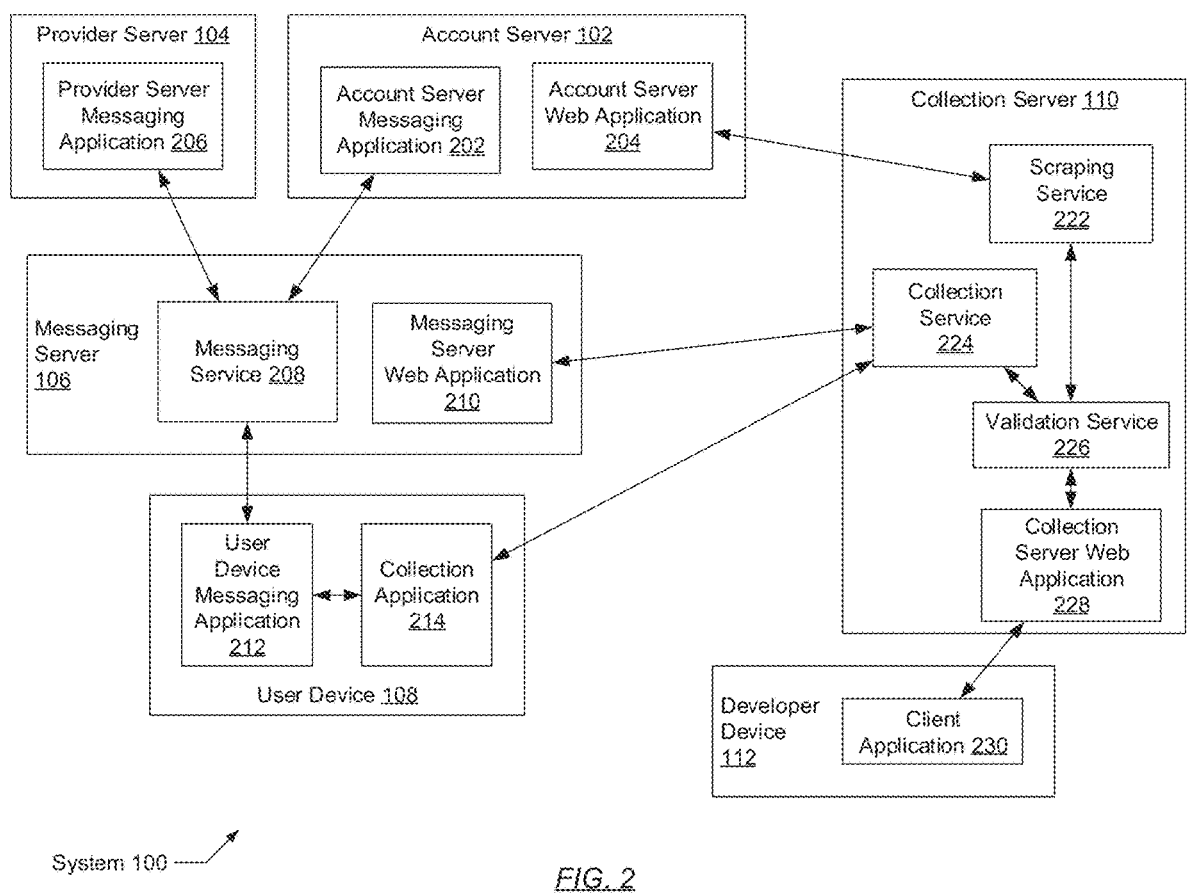
FIG. 2 shows a system and components of the system in accordance with one or more embodiments of the present disclosure.

FIG. 2 shows a diagram of a system (100) in accordance with one or more embodiments of the invention. The account server (102), provider server (104), messaging server (106), user device (108), collection server (110), and developer device (112) include programs, modules, data, and components for verifying scraping scripts. In one or more embodiments, one or more of the components shown in FIG. 1 may be omitted, repeated, and/or altered as shown from FIG. 2. Accordingly, the scope of the present disclosure should not be considered limited to the specific arrangement of components shown in FIG. 2.

The account server (102) is connected to the messaging server (106) and to the collection server (110) using one or more protocols that include email protocols, SMS protocols, MMS protocols, hypertext transfer protocol (HTTP), HTTP secure (HTTPS), transmission control protocol internet protocol (TCP/IP), user datagram protocol (UDP), etc. In one or more embodiments, the account server (102) includes the account server messaging application (202) and the account server web application (204). In one or more embodiments, the account server (102) hosts a website of a financial institution, such as a bank, with the account server web application (204) that is accessible to the user of the user device (108) via HTTPS.

The account server messaging application (202) connects through one or more messaging protocols to the messaging service (208) of the messaging server (106). The account server messaging application (202) sends and receives messages related to the accounts maintained by the account server (102).

The account server web application (204) provides access to certain information from the account server (102). In one or more embodiments, the account server web application (204) is a website that is accessed utilizing a set of webpages generated with one or more hypertext markup language (HTML) and JavaScript files. The webpages have content, layout information, and links that can be changed at any time. Changing the content, layout, and links in the webpages of the website changes how the website needs to be interacted with in order to gather, scrape and obtain information from the website. When a website changes, the scripts used to access the website no longer work. In other words, the scripts no longer function to capture the information intended to be captured by the script. Because the script may capture some information from portions of the website that remain the same while other portions change, and because of the large number of scripts and changing user accounts, detecting that a script is not working may be challenging. One or more embodiments, using messaging information to verify scripts. The information accessible from the account server (102) by the account server web application (204) includes transaction data for transactions that are posted to an account maintained by the account server (102).

The provider server (104) is connected to the messaging server (106). In one or more embodiments, the provider server (104) includes the provider server messaging application (206), which communicates with the messaging service (208) of the messaging server (106) to exchange information between the provider server (104) and the messaging server (106). In one or more embodiments, the provider server (104) also hosts a website of a business, such as a store. Transactions with the store by the user can be completed using the account maintained by the account server (102).

The messaging server (106) connects to the account server (102), to the provider server (104), connects to the user device (108), and connects to the collection server (110). In one or more embodiments, the messaging server (106) includes the messaging service (208) and the messaging server web application (210).

The messaging service (208) connects to the account server messaging application (202), connects to the provider server messaging application (206), and connects to the user device messaging application (212). The messaging service (208) provides for the exchange of messages between the applications that are connected to the messaging service (208). Messages exchanged with the messaging service (208) are in accordance with one or more messaging protocols, and include an address and a body, as discussed above.

The messaging server web application (210) connects to the collection service (224) of the collection server (110). In one or more embodiments, the web application (210) is a website that provides access to the messages that are stored by the messaging server (106) and are sent and received by the messaging service (208).

The user device (108) connects to the messaging server (106) and to the collection server (110). In one or more embodiments, the user device (108) includes the user device messaging application (212) and the collection application (214).

The user device messaging application (212) connects to the messaging service (208) and to the collection application (214) of the user device (108). Connection to the messaging service (208) uses one or more messaging protocols to pass messages between the user device (108) and the messaging server (106). The user device messaging application (212) exposes an application programming interface (API) to access and generate messages that are communicated using the messaging server (106).

The collection application (214) of the user device (108) connects to the collection service (224) of the collection server (110). In one or more embodiments, the collection application (214) of the user device (108) accesses the user device messaging application (212) using the API exposed by the user device messaging application (212) to retrieve messages that were sent from the messaging server (106). The collection application (214) uses a custom protocol defined in accordance with UDP for accessing the collection service (224) of the collection server (110). The collection application (214) provides messages from the messaging server (106) to the collection server (110).

The collection server (110) includes the scraping service (222), the collection service (224), the validation service (226), and the collection server web application (228). The collection server (110) analyzes data retrieved from the account server (102), the messaging server (106), and the user device (108) and provides the analysis with alerts and updates to the developer device (112).

The scraping service (222) scrapes data from the account server (102) using one or more scraping scripts. The scraping scripts automate the process of retrieving account information from the account server (102) and are written in one or more programming or scripting languages, which include Python, Perl, ANSI C, C++, Go, Bash, etc. The scraping service (222) connects to the web application (204) of the account server (102). In one or more embodiments, the collection server web application (204) is accessed using the HTTPS protocol to scrape data from the account server (102).

The collection service (224) collects messages from one or more of the messaging server (106) and the user device (108) using one or more message collection programs. The collection service (224) connects to the collection application (214) of the user device (108) and to the messaging server web application (210). The collection service (224) retrieves messages sent to a user of the user device (108) by way of the messaging server (106).

The validation service (226) gathers and analyzes data from the scraping service (222) and from the collection service (224) to determine whether the scraping scripts need to be updated based on the messages gathered from the collection service (224). The analysis provided by the validation service (226) may be pushed to the collection server web application (228) or stored in a database to be retrieved by the collection server web application (228).

The collection server web application (228) connects to the client application (230) of the developer device (112). The collection server web application (228) converts the analysis generated by the validation service (226) into a form that can be presented on the client application (230), which is discussed below. In one or more embodiments, collection server web application (228) is a website.

The developer device (112) connects to the collection server web application (228). The developer device (112) monitors the collection server (110) for the analysis of the scraping scripts. Monitoring of the analysis generated by the collection server (110) is through the exchange of one or more messages, e.g., emails, SMS messages, MMS messages, web pages, instant messages, text messages, etc.

The client application (230) is a set of programs on the developer device (112) that connect to the collection server web application (228). The client application (230) receives alerts from the collection server and displays the alerts to the developer of the developer device (112). The client application (230) can also receive updates for the scraping scripts that are identified in the alerts and need to be updated. The updates are received as input from the developer and transmitted to the collection server (110). In one or more embodiments, programs that make up the client application (230) include a web browser, a source code browser, an integrated development environment, etc.

The above describes one or more embodiments of the technology. One or more embodiments of the technology may deviate from those shown in FIGS. 1 and 2 and described above. For example, one or more of the messaging applications may be remote applications that are accessed via the Internet, such as through a browser, rather than locally executing on a client. Further, by way of another example, the provider server may omit a messaging application in some embodiments. Additionally, multiple different messaging platforms with corresponding messaging applications may be used in some embodiments. Similarly, some components of FIGS. 1 and 2 may be combined into a single component and the functionality described as being performed by a single component may be performed by two or more components.

Figure 3:
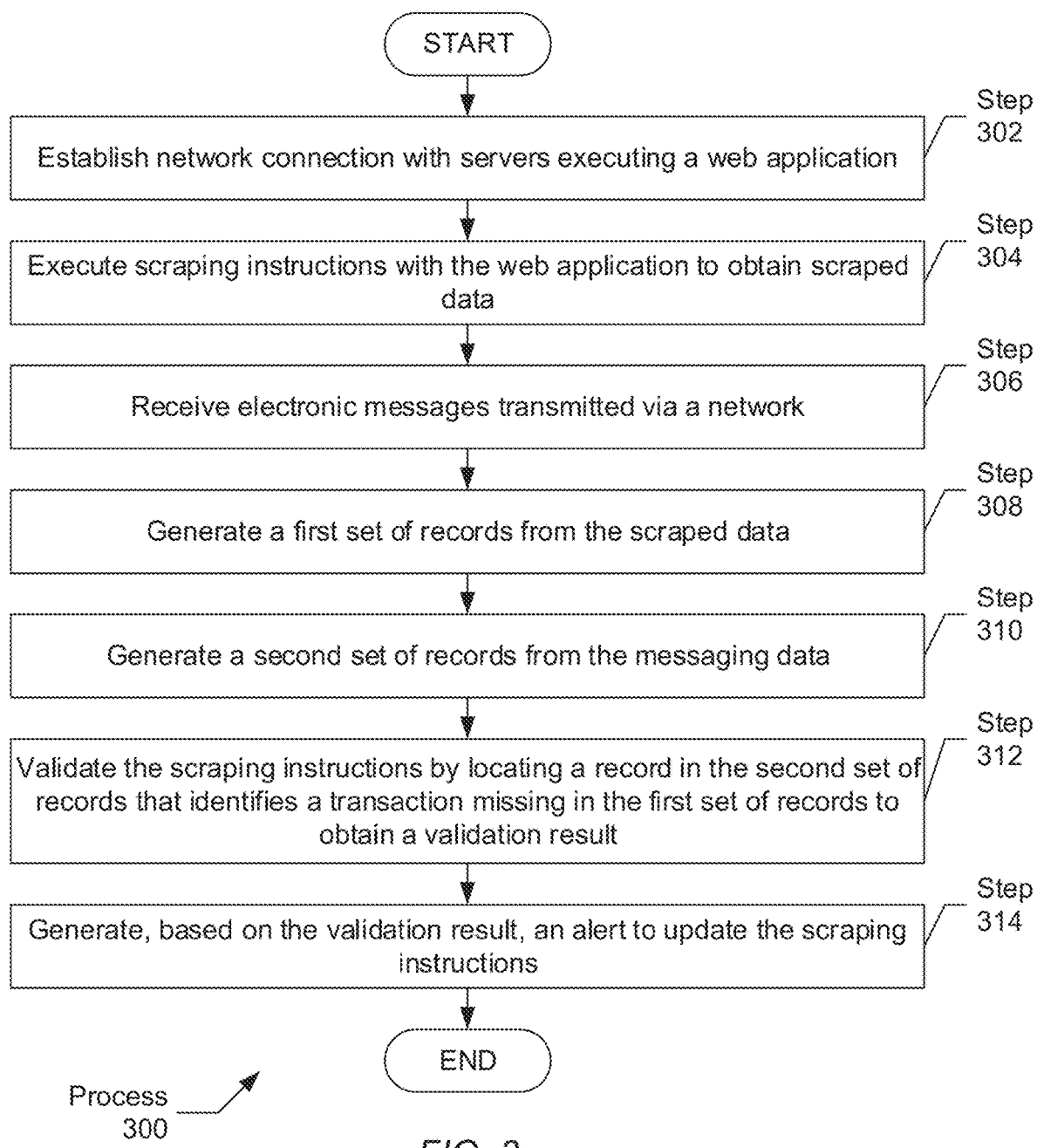
FIG. 3 shows a method for validating scripts in accordance with one or more embodiments of the present disclosure.

FIG. 3 shows a flowchart in accordance with one or more embodiments of the present disclosure. The flowchart of FIG. 3 depicts a process (300) for validating scraping scripts. The process (300) can be implemented on one or more components of the system (100) of FIG. 1. In one or more embodiments, one or more of the steps shown in FIG. 3 may be omitted, repeated, and/or performed in a different order than the order shown in FIG. 3. Accordingly, the scope of the present disclosure should not be considered limited to the specific arrangement of steps shown in FIG. 3.

In Step 302, a network connection is established with servers executing a web application. In one or more embodiments, the scraping service of the collection server establishes the network connection with the web application of the account server using HTTPS. The web application is identified in the scraping instructions in the scraping script that is used to scrape the information from the account server.

In Step 304, scraping instructions are executed with a web application to obtain scraped data. In one or more embodiments, scraping service of the collection server executes the scraping instructions from a scraping script with the account server web application. The scraping instructions are executed in a client web browser that is operated by the scraping service and that connects to and interacts with the account server web application. The scraping instructions include instructions for logging into the account server web application using a client web browser; interacting with the web application by activating links, editing fields, and generating keyboard and mouse events; and receiving data provided by the account server, referred to as scraped data.

In Step 306, electronic messages transmitted via the network are received. In one or more embodiments, the electronic messages include one or more SMS messages, MMS messages, email messages, instant messages, text messages, etc. The electronic messages are collected with the collection service. For example, the electronic messages may be transmitted between the account server and the user device using the messaging server. The electronic messages are received from the collection application of the user device and/or via the messaging server web application by the collection service.

In Step 308, a first set of records is generated from the scraped data. In one or more embodiments, the scraped data describes a set of transactions for at least one account that is associated with a user of the user device. Each record includes several fields for different types of metadata associated with the transactions that are described in the scraped data. For example, when the account is a bank account, the records can include fields for one or more of a transaction date, a transaction time, a transaction value, a transaction type, and an entity type. Depending upon the type of data provided by the web application, some or all of the fields for each record are filled in for each transaction present in the scraped data. In one or more embodiments, scraping script used to access the data from the account server stores the data into the corresponding fields of a database to generate the first set of records.

In Step 310, a second set of records is generated from the messaging data. In one or more embodiments, the messaging data includes a set of messages and each message describes a transaction. In one or more embodiments, the second set of records includes a set of fields that are the same as at least a portion of the fields in the first set of records obtained from the scraped data. Depending upon the content of a message, one or more of the fields for a record in the second set of records is populated with data from the message. One or more machine learning algorithms and pattern matching algorithms are used to extract the information from the message and insert field values in the fields of the record for the second set of records, which is further described below.

In Step 312, scraping instructions are validated by locating a record in the second set of records that identifies a transaction that is missing from the first set of records to obtain a validation result. In one or more embodiments, the validation service validates the scraping instructions that were used to obtain the scraped data by locating each record in the second set of records (from the messaging data) in the first set of records (from the scraped data). In other words, the scraping instructions validate that the messaging data does not identify a transaction that is missing in the scraped data. In order to locate and match a record from the second set to a record in the first set, at least a portion of the data in the record from the second set should match a portion of the record in the first set. For example, the matching portion may be date, time, and value of the transaction. As another example, the matching portion may be provider identifier, value, and date of the transaction. Further, matching may be performed after one or more of the fields are normalized.

The normalization may transform the fields into a standardized format. By way of another example, the matching may be performed based on a probability that the transactions match. The validation result identifies one or more records from the second set of records that are missing from the first set of records.

In Step 314, an alert is generated based on the validation result to update the scraping instructions. In one or more embodiments, the alert is generated by the validation service after locating a record in the second set of records that is missing from the first set of records. The alert identifies one or more of: the scraping script that needs maintenance, the account server, the account server web application, and one or more records in the second set of records that associated with transactions found in the messaging data that were not found in the scraped data.

In one or more embodiments, the second set of records may be generated while matching the second set of records to the first set of records. For example, field values may be extracted from a message for a record in the second set of records and compared to the first set of records without storing the record in the second set. As another example, field values may be extracted from a message for a record in the second set of records, compared to the first set of records while storing the record in the second set.

Figure 4A:
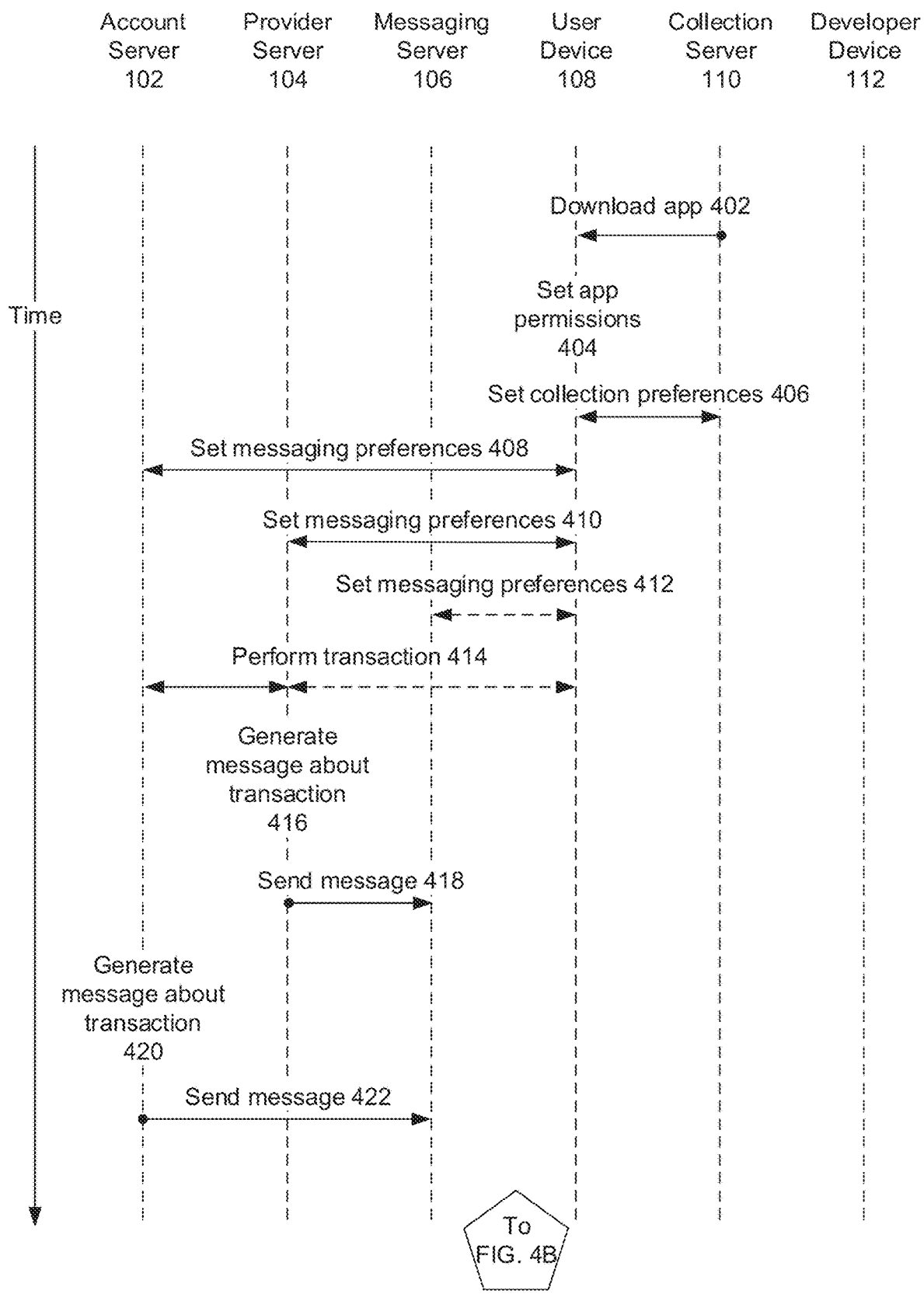
FIGS. 4A, 4B, and 4C show an example in accordance with one or more embodiments of the present disclosure.
Figure 4B:
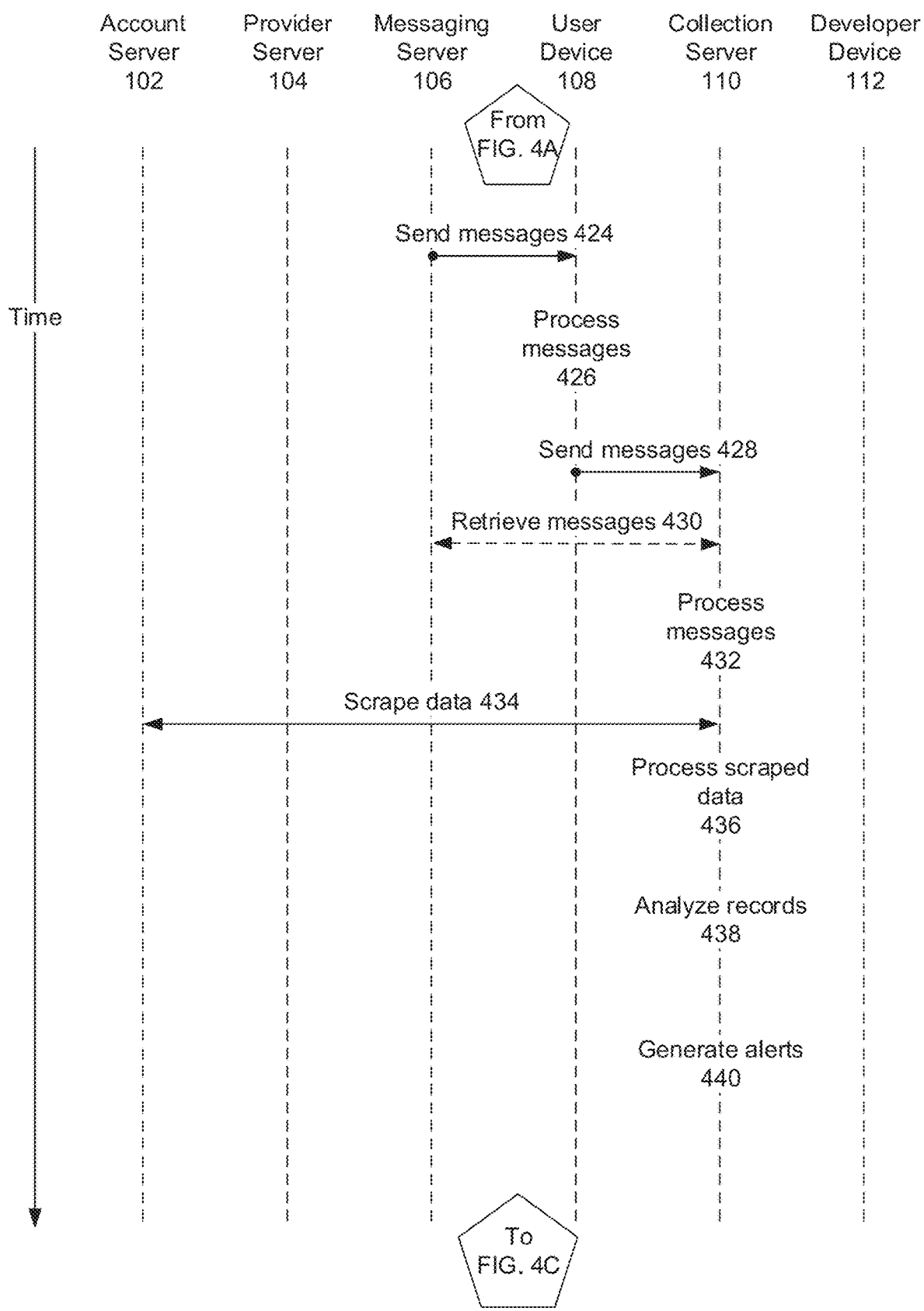
Figure 4C:
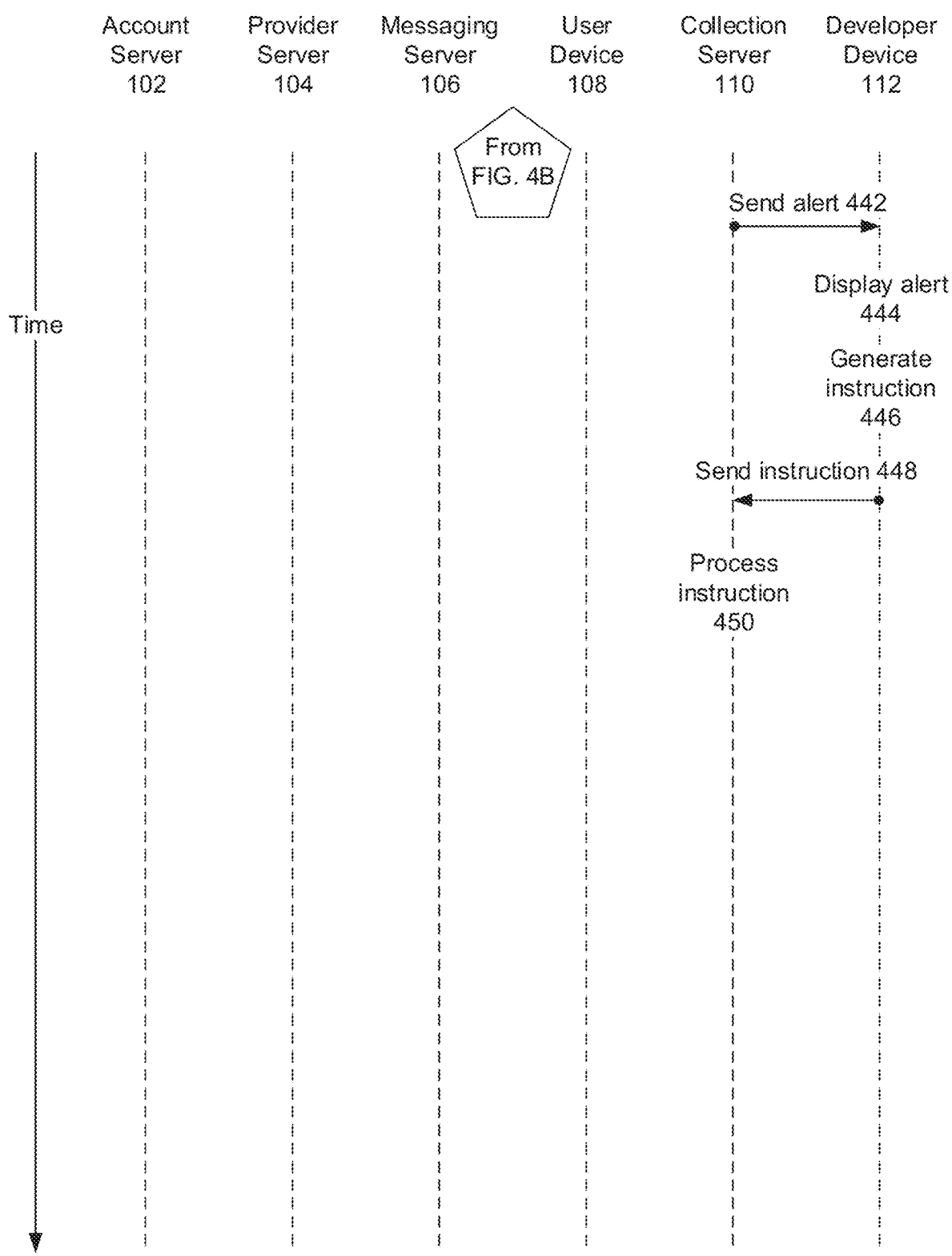

FIGS. 4A, 4B, and 4C show a sequence diagram in accordance with one or more embodiments of the present disclosure. The sequence diagram of FIGS. 4A, 4B, and 4C depicts a set of computer implemented processes to validate scraping scripts. The processes can be implemented and operated on the system (100) of FIG. 1. In one or more embodiments, one or more of the steps shown in FIGS. 4A, 4B, and 4C may be omitted, repeated, and/or performed in a different order than the order shown in FIGS. 4A, 4B, and 4C. Accordingly, the scope of the present disclosure should not be considered limited to the specific arrangement of steps shown in FIGS. 4A, 4B, and 4C.

Referring to FIG. 4A, in Step 402, an application is downloaded. In one or more embodiments, the collection application (214) is provided by the collection server (110) and is downloaded by the user device (108) using an application store.

In Step 404, application permissions are set. In one or more embodiments, the permissions of the collection application (214) are set within the user device (108). The permissions allow for access, by the collection application, to other data, programs, and databases that are resident on the user device (108), including the messaging application (212) and messaging databases.

In Step 406, collection preferences are set. In one or more embodiments, the collection preferences are selected with a user interface displayed on the user device (108) and are transmitted to the collection server (110). The collection service (224) receives the collection preferences for each user of the system (100) and collects messaging data in accordance with the collection preferences for each user. The collection preferences enumerate and identify the types of messaging data that can be collected, including text messages, SMS messages, MMS messages, instant messages, email, etc. The collection preferences also enumerate and identify the sources from which the messaging data can be collected, such as from the user device (108) using the collection application (214) or the messaging server (106) using the web application (210) of the messaging server (106). The sources of messaging that can be selected with the collection preferences is based on the types of messaging data that have been selected to be collected.

In Step 408, messaging preferences for the account server (102) are set. In one or more embodiments, the user device (108) accesses the web application (204) to set the messaging preferences. The messaging preferences enumerate and identify the types of messages that will be sent, the delivery method of the messages, and one or more filters to be used on the messages. The messaging preferences for types of messages identify the transactions for which messages will be generated, including debit transactions and credit transactions. The messaging preferences for delivery methods identify which types of messaging platforms (email, SMS, instant messaging, etc.) will be used to send the messages generated by the account server (102).

In Step 410, messaging preferences for the provider server (104) are set. In one or more embodiments, the user device (108) accesses a website of the provider server (104) to set the messaging preferences. The messaging preferences enumerate and identify the types of messages that will be sent and the delivery method of the messages, similar to the messaging preferences for the account server (102).

In Step 412, messaging preferences for the messaging server (106) are optionally set. In one or more embodiments, the user device (108) accesses a website hosted by the messaging server (106) to set the messaging preferences. The messaging preferences for the messaging server (106) enumerate and identify rules for filtering and forwarding messages for the user of the user device (108) that are handled with the messaging server (106).

In Step 414, a transaction is performed. In one or more embodiments, the transaction is performed between one or more of the account server (102), the provider server (104), and the user device (108). For example, the user of the user device (108) may engage in a transaction with the provider server to purchase a service or product with the purchase amount being debited from a bank account of the user that is maintained by the account server (102). As another example, the user of the user device (108) may attempt to login to a web application hosted by the provider server, which verifies and authorizes the access with the account information stored in the account server (102).

In Step 416, a message is generated about the transaction. In one or more embodiments, the provider server (104) generates the message based on the messaging preferences that were set in Step 410. For example, when the transaction is accessing a web application, the message describes the web application being accessed, the type of access being requested, and the date and time of the access to the web application. When the transaction is a purchase, the message describes the type of purchase, the amount of the purchase, and the date and time of the purchase.

In Step 418, a message is sent from the provider server (104) to the messaging server (106). In one or more embodiments, the format and protocols used for the message are based on the messaging preferences that were set in Step 410.

In Step 420, a second message is generated about the transaction. In one or more embodiments, the account server (102) generates the message based on the messaging preferences that were set in Step 408. For example, when the transaction is accessing a web application, the message describes the account used to access the web application, the type of access being requested, and the date and time of the access to the web application. When the transaction is a purchase, the message describes the account, the account balance, the type of purchase, the amount of the purchase, and the date and time of the purchase.

In Step 422, a message is sent from the account server (102) to the messaging server (106). In one or more embodiments, the format and protocols used for the message are based on the messaging preferences that were set in Step 408.

Referring to FIG. 4B, in Step 424, messages sent from the messaging server (106) and are received by the user device (108). In one or more embodiments, messages include the message generated by the provider server (104) for the transaction and the messages generated by the account server (102) for the account associated with the transaction.

In Step 426, the messages are processed by the user device (108). In one or more embodiments, processing the messages includes one or more of storing the messages, identifying a sender of the message, classifying the type of message, and generating a record with a set of fields that are populated with information extracted from the message.

In Step 428, messages are sent from the user device (108) to the collection server (110). In one or more embodiments, the messages that are sent include the messages received by the user device (108) from the messaging server (106) and include data generated by processing the messages from the messaging server (106).

In optional Step 430, the collection server (110) retrieves messages from the messaging server (106). In one or more embodiments, the retrieval is based on the collection preferences set in Step (406). When the messaging server (106) hosts a web application for access to the messages, such as for web-based email, the collection server (110) executes a scraping script to retrieve the messages from the messaging server. When the messaging server (106) is an email server, forwarding and filtering preferences set on the messaging server (106) in Step 412 are used to forward filtered messages from the messaging server (106) to the collection server (110).

In Step 432, messages are processed by the collection server (110). In one or more embodiments and as described further below, the messages are processed to generate a set records with fields that are populated with information extracted from the messages. Pattern matching and machine learning algorithms are used to extract the information from the messages to populate the fields of the records.

In Step 434, data from the account server (102) is scraped by the collection server (110). In one or more embodiments, one or more scraping scripts are executed by the collection server (110) to access and retrieve the account and transaction information provided by the account server (102). The account and transaction information provided by the account server (102) are referred to as scraped data.

In Step 436, the data scraped from the account server (102) is processed by the collection server (110). In one or more embodiments, processing the scraped data includes generating a set of records with a set of fields that are populated with information extracted from the scraped data. The information extracted from the scraped data is extracted using one or more pattern matching algorithms and machine learning algorithms.

In Step 438, records generated from the messages and from the scraped data are analyzed by the collection server (110). In one or more embodiments, the analysis of the records is used to validate the scraping scripts that are used to scrape data from the account server (102). Validation is performed by locating each transaction from a second set of records in a first set of records to determine whether each transaction from the second set of records exists in or is missing from the first set of records. The second set of records are the records generated from the messages and the first set of records are the records generated from the scraped data.

In Step 440, alerts and updates are generated by the collection server (110).

In one or more embodiments, the alerts are generated based on whether the scraping scripts have been validated.

Referring to FIG. 4C, in Step 442, an alert is sent from the collection server (110) to the developer device (112). In one or more embodiments, the alert delivered to the developer device (112) identifies a scraping script that needs to be updated because the validation indicated that a transaction was found in a message that was not found in the scraped data.

In Step 444, an alert is displayed by the developer device (112). In one or more embodiments, the alert is displayed with a graphical user interface of the developer device (112).

In Step 446, an instruction is generated by the developer device (112). In one or more embodiments, the instruction includes an update to the scraping script. The update to the scraping script fixes the scraping script so that subsequent execution of the scraping script will correctly gather the transaction information that triggered the validation result.

In Step 448, the instruction is sent from the developer device (112) to the collection server (110). In one or more embodiments, the instruction is sent using a different protocol then the protocol used to send the alert in Step 442. For example, when the alert is sent as a text message, the instruction may be sent through the use of a web application that provides access to the scraping script to the developer device (112).

In Step 450, the collection server (110) processes instructions from the developer device (112). In one or more embodiments, a set of instructions are processed to update the scraping script that was not successfully validated.

In Step 454, the alert is displayed by the user device (108). In one or more embodiments, the alert is displayed by being presented on a user interface of the user device (108).

Figure 5:
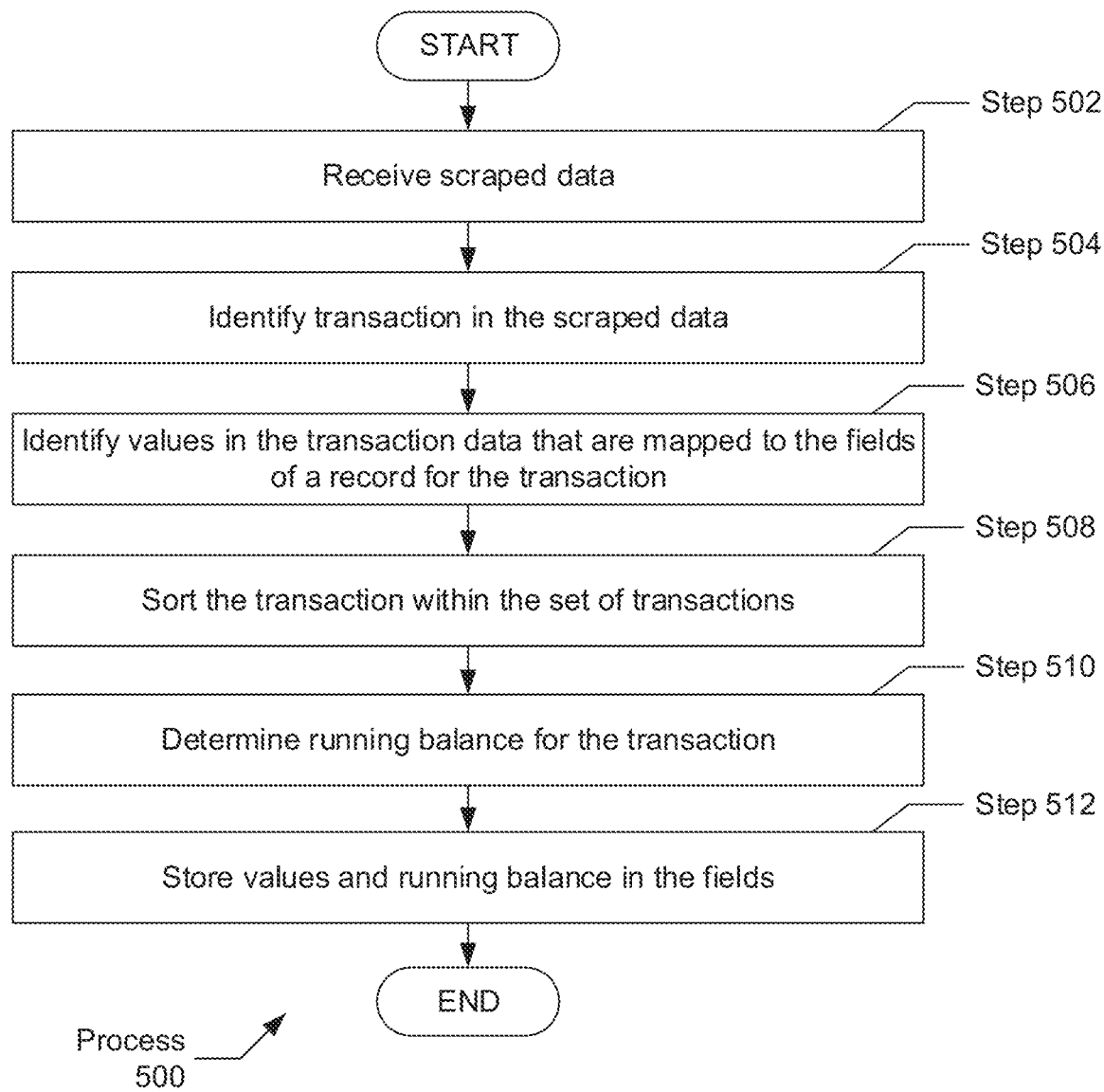
FIG. 5 shows a method for generating records from scraped data in accordance with one or more embodiments of the present disclosure.

FIG. 5 shows a flowchart in accordance with one or more embodiments of the present disclosure. The flowchart of FIG. 5 depicts a process (500) for processing scraped data to generate a first set of records. The process (500) can be implemented on one or more components of the system (100) of FIG. 1. In one or more embodiments, one or more of the steps shown in FIG. 5 may be omitted, repeated, and/or performed in a different order than the order shown in FIG. 5. Accordingly, the scope of the present disclosure should not be considered limited to the specific arrangement of steps shown in FIG. 5.

In Step 502, scraped data is received. In one or more embodiments, the scraped data is received by the collection server in response to execution of a scraping script that accesses the account server. The scraped data describes a set of transactions with each transaction described by transaction data.

In Step 504, a transaction is identified in the scraped data. In one or more embodiments, the collection server identifies the transaction based on the transaction data within the scraped data.

In Step 506, values in the transaction data that are mapped to the fields of a record are identified for the transaction. In one or more embodiments, the values in the transaction data include values for a transaction type, a transaction amount, a transaction description, a transaction date, and a transaction balance, which are mapped to corresponding fields in a record. Table 1 below provides an example mapping of record fields to transaction data values. In one or more embodiments, the values in the transaction data for the transaction are mapped to a subset of the fields that are available in the records.

TABLE 1 example mapping of record fields to transaction data values.

| Record Field Name | Transaction Data Value |
|---|---|
| tp_account_txn_id | |
| Status | |
| posted_date | |
| transaction_date | transaction date |
| tp_trn_account_id | |
| transaction_type | transaction type |
| reference_no | |
| value_type | |
| value_amount | transaction amount |
| interest_amount | |
| principal_amount | |
| fee_amount | |
| escrow_amount | |
| bonus_amount | |
| Symbol | |
| cusip_no | |
| unit_value | |
| unit_quantity | |
| unit_type | |
| unit_action | |
| institution_txn_id | |
| description 1 | transaction description |
| Memo | |
| user1 | |
| created_by | |
| created_date | |
| created_process | |
| modified_by | |
| modified_date | |
| modified_process | |
| currency_symbol minOccurs=0 | |
| commission_amount minOccurs=0 | |
| confirmation_no minOccurs=0 | |
| running_balance_amount | transaction balance |

In Step 508, the transaction is sorted within the set of transactions that are present in the scraped data. In one or more embodiments, the collection server sorts the set of transactions by date.

In Step 510, a running balance is determined for the transaction. In one or more embodiments, the collection server determines the running balance for the transaction by identifying a starting balance for the transaction and combining the starting balance with a transaction amount for the transaction to generate the running balance for the transaction. The running balance may be checked against a running balance provided by the scraped data in the transaction data for the transaction.

In one or more embodiments, the running balance for a transaction in the scraped data is the balance of an account after the transaction and all previous transactions are accounted for with respect to a starting balance in the order that the transactions occur. For example, the scraped data can include a monthly starting balance and all of the transactions that occurred within the month. Determining the running balance for each transaction by the collection server starts with the monthly starting balance and adding or subtracting the value of the first transaction to the monthly starting balance to determine the running balance for the first transaction. Each subsequent transaction starts with the running balance calculated for the prior transaction and adds or subtracts the value of the subsequent transaction to determine the running balance for the subsequent transaction.

In one or more embodiments, the scraped data from the account server includes a running balance for each transaction that is compared to the running balance determined by the collection server for each transaction. When the running balance from the scraped data does not match the running balance determined by the collection server for a transaction, an alert is generated that identifies the discrepancy between the running balances and indicates that the scraping script needs to be updated.

In one or more embodiments, the running balance determined by the collection server is compared to a running balance that was included within a message about a transaction. When the running balance from the message does not match the running balance determined from the scraped data by the collection server for a transaction, an alert is generated that identifies the discrepancy between the running balances and indicates that the scraping script needs to be updated.

In Step 512, the values and running balance are stored in the fields of a record for the transaction. In one or more embodiments, the collection server stores the values from the transaction data and the calculated running balance into the fields of a record for the transaction into a database.

Figure 6:
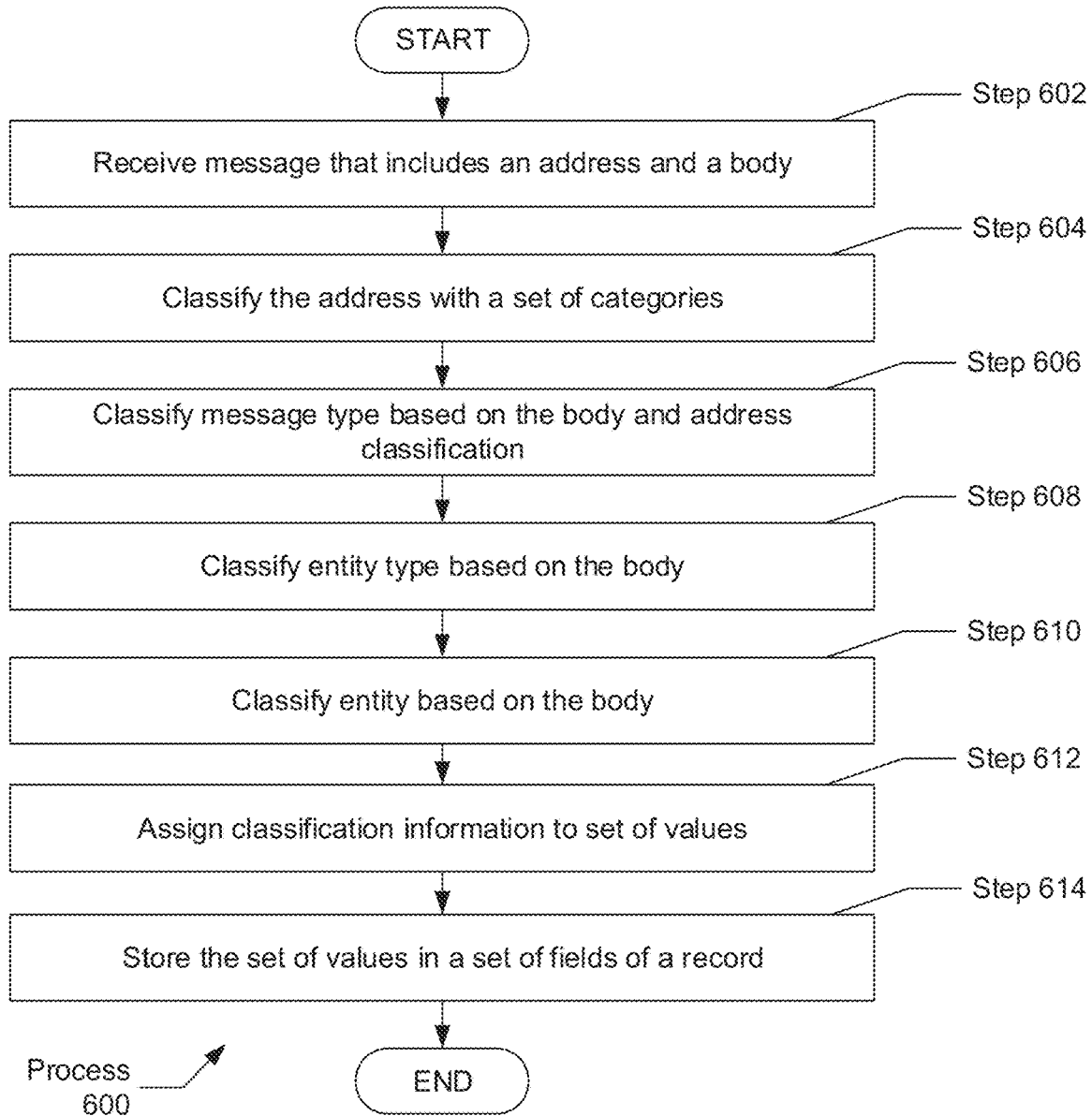
FIG. 6 shows a method for generating records from messages in accordance with one or more embodiments of the present disclosure.

FIG. 6 shows a flowchart in accordance with one or more embodiments of the present disclosure. The flowchart of FIG. 6 depicts a process (600) for processing messages to generate a second set of records. The process (600) can be implemented on one or more components of the system (100) of FIG. 1 and individual steps may be performed by either the collection application on the user device (108) or by the collection service (224) on the collection server (110). In one or more embodiments, one or more of the steps shown in FIG. 6 may be omitted, repeated, and/or performed in a different order than the order shown in FIG. 6. Accordingly, the scope of the present disclosure should not be considered limited to the specific arrangement of steps shown in FIG. 6.

In Step 602, a message is received that includes an address and a body. In one or more embodiments, the message is one of a set of messages that the collection server (110) receives from one or more of the user device (108) and the messaging server (106). The message includes transaction data describing a transaction that is part of the account information provided by the account server (102). Table 2 below shows a set of example SMS messages that can be processed by the system (100).

TABLE 2 example SMS messages.

| # | Address | Body |
|---|---|---|
| 1 | 321-123-5678 | Your a/c 72940 is debited $228.00 on 15-04-2018 14:55:32 A/c Bal is $3288.00 Info: SHSTR#12 662345283/FINANS CORP |
| 2 | 321-123-5678 | Your a/c 72940 is credited $180.00 on 30-03-2018 14:55:32 A/c Bal is $2788.00 Info: CASH-ATM/CW383 |
| 3 | 301-103-5678 | Hey, let's do lunch☺ |
| 4 | 302-836-2852 | Your purchase at ShoeStore #12 of brand_name_shoes for $228.00 paid on 15-APR-18 is confirmed. Thank you for business! |

In Step 604, an address of the message is classified using a set of categories. In one or more embodiments, a database of the system (100) maintains the categories of the set of categories. The categories identify types of message senders and include categories for financial institutions, retail companies, and individuals. The classification is determined from the address of the message and is further described in relation to FIG. 7. Messages that do not include address classifications that match certain categories will not be processed by the system. For example, message 3 of Table 2 is a personal message that includes an address that is not classified as either a financial institution or a store and message 3 will not be processed by subsequent steps of the process (600).

In Step 606, the message types are classified based on the body of the message and the address classification. In one or more embodiments, the message type is classified by identifying a keyword in the body of the message. In one or more embodiments, the types of messages include types for a debit message, a credit message, a payment due message, a payment overdue message, and a payment received message. Furthering the example from Table 2, Table 3 identifies the message type classifications for messages 1, 2, and 4 and the keywords are double angle bracketed. The message type of message 3 is not classified because the address classification for message 3 did not match with a category that is recognized with a financial institution or a store.

TABLE 3 example message type classification.

| # Message type | Body |
|---|---|
| 1 Debit message | Your a/c 72940 is <<debited>> $228.00 on 15-04-2018 14:55:32 A/c Bal is $3288.00 Info: SHSTR#12 662345283/FINANS CORP |
| 2 Credit message | Your a/c 72940 is <<credited>> $180.00 on 30-03-2018 14:55:32 A/c Bal is $2788.00 Info: CASH-ATM/CW383 |
| 4 Payment received message | Your purchase at ShoeStore #12 of brand_name_shoes for $228.00 <<paid>> on 15-APR-18 is confirmed. Thank you for business! |

In Step 608, entity types within the body are classified. In one or more embodiments, the body of the message includes a set of entities. Each entity in the message is identified with one or more entity identifiers that are associated with strings of text in the message. The entities form the metadata that describe the transaction within the message. Example entity types include debit entities, credit entities, and balance entities. Message 1 from Table 2 includes a debit entity and a balance entity. Existence of the debit entity is recognized by the process (600) from the entity identifier string "debited" that appears in the message. Existence of the balance entity is recognized from the entity identifier string "Bal" within the message. Recognition of the strings for the entity is performed using one or more pattern matching algorithms and machine learning algorithms.

In Step 610, the entities within the message are classified based on the contents of the body of the message. Classification of the entities is performed by identifying groups of numbers within the body of the message and identifying the relative location of the groups of numbers with respect to the entity identifiers. In one or more embodiments, the closest group of numbers that occurs after an entity identifier is associated with the entity identified by that entity identifier. For example, the group of numbers "228.00" in message 1 of Table 2 is the closest group of numbers after the entity identifier "debited" and is associated with the debit entity of the message. The group of numbers "3288.00" in message 1 of Table 2 is the closest group of numbers after the entity identifier "Bal" and is associated with the balance entity of the message.

In Step 612, the classification information is assigned to a set of values. In one or more embodiments, the classification information includes the transaction data that is identified within the entities within the message. For example, the classification information of message 1 of Table 2 includes the debit amount of $228.00 and the balance amount of $3,288.00. The debit amount and the balance amount are assigned to a debit value and a balance value in a set of values and a transaction type value is set to a debit transaction type.

In Step 614, the set of values are stored in a set of fields of a record. In one or more embodiments, the values in the set of values are mapped and copied to specific fields of the record. For example, the debit value of $228.00, the balance value of $3,288.00, and the transaction type value of "debit" are mapped and copied to the respective record fields of "value_amount", "running_balance_amount", and "transaction_type" from Table 1.

Figure 7:
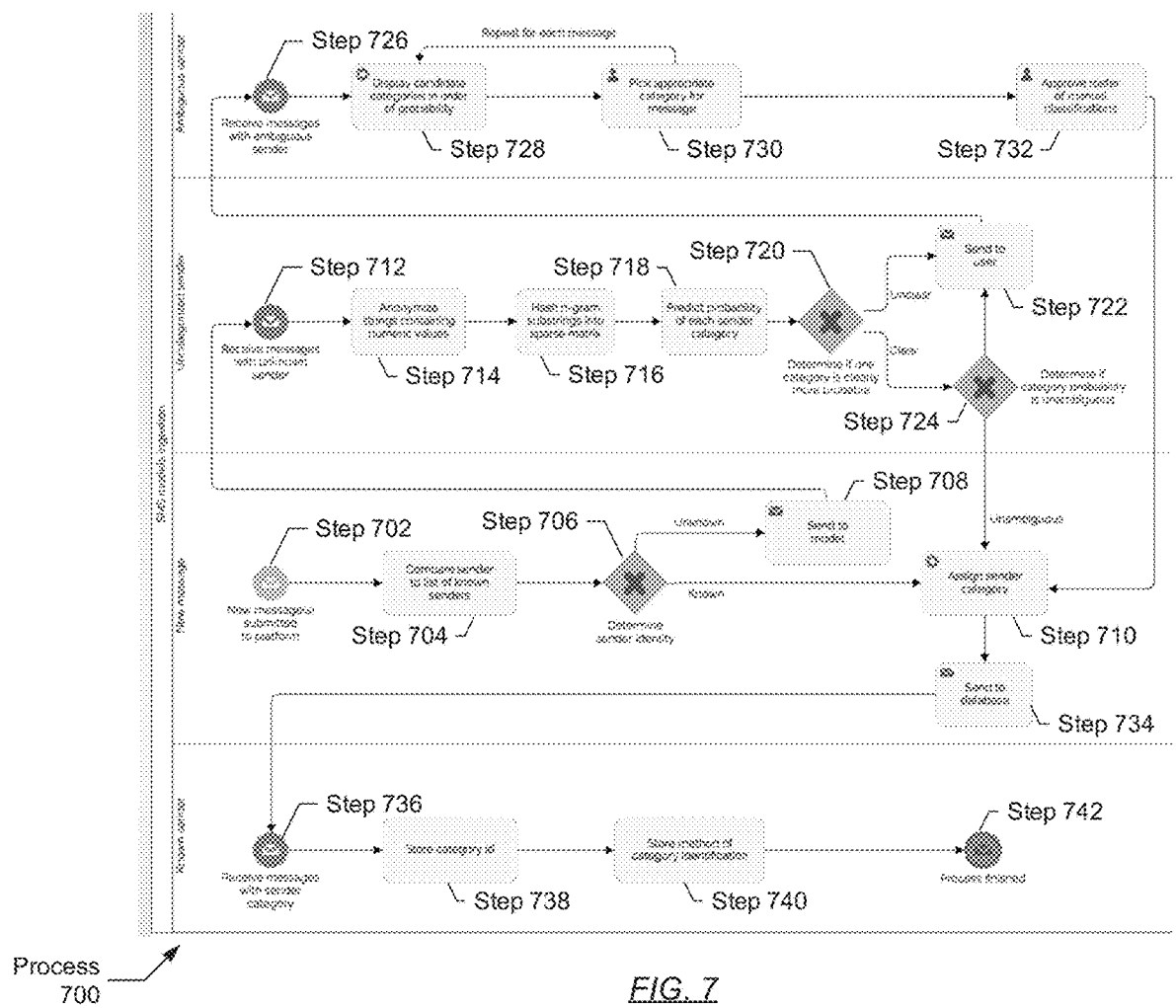
FIG. 7 shows a method for classifying sender addresses in accordance with one or more embodiments of the present disclosure.

FIG. 7 shows a flowchart in accordance with one or more embodiments of the present disclosure. The flowchart of FIG. 7 depicts a process (700) for identifying message sender addresses by classifying the addresses with a set of categories. The process (700) can be implemented on one or more components of the system (100) of FIG. 1 and individual steps may be performed by either the collection application (214) on the user device (108) or by the collection service (224) on the collection server (110). In one or more embodiments, one or more of the steps shown in FIG. 7 may be omitted, repeated, and/or performed in a different order than the order shown in FIG. 7. Accordingly, the scope of the present disclosure should not be considered limited to the specific arrangement of steps shown in FIG. 7.

In Step 702, a new message is received. In one or more embodiments, the message was created by one of the provider server (104) and the account server (102) and was sent to the messaging server (106) in order to be sent to the user of the user device (108). The message is received by one or more of the collection server (110) and the user device (108). The collection server (110) may receive the message from one of the messaging server (106) and the user device (108). The user device may receive the message from the messaging server (106).

In Step 704, the sender of the message is compare to a list of known senders. In one or more embodiments the sender is identified from the address of the message, which is compared to the addresses in the list of known senders. One or more pattern matching algorithms and machine learning algorithms are used to perform the comparison.

In Step 706, the identity of the sender is determined based on the comparison from Step 704. When the address of the message is unknown, the address does not match an address in the list of known senders and the process (700) proceeds to Step 708. When the address is known, the address matches an address in the list of known senders and the process (700) proceeds to Step 710.

In Step 708, the message is sent to a categorization model. In one or more embodiments, the categorization model is a computer implemented method that determines the category to which the message is associated.

In Step 710, a category is assigned to the address of the sender. In one or more embodiments, the category is determined based on one or more of the list of known senders, a determination from the categorization model, and a manual classification. Each address in the list of known senders is identified and associated with a category. After locating the message address in the list of known senders, the category associated with the matching address in the list of known senders is assigned to the message address. The determination from the categorization model is further discussed below and includes a probability that a category of the set of categories is unambiguous and is based on a probability that the category is clearly more probable than the other categories in the set of categories. The category that is unambiguous and is clearly more probable than the other categories is assigned as the category of the message address. The manual classification, further discussed below, is selected by the user and is approved by the system (100). After the selection and approval, the selected category is assigned as the category of the message address. After assigning the category, the process (700) proceeds to Step 734.

In Step 712, a message with an unknown sender is received. In one or more embodiments, the categorization model receives the message that includes and address that was not found in the list of known senders.

In Step 714, strings containing numeric values are anonymized. In one or more embodiments, the message is split into a set of strings based on one or more white space and punctuation symbols within the message. A determination is made for each string that includes at least one number as to whether the string identifies a numeric value, such as an account number, an account balance, etc. For each string identified as a numeric value, each number within the string is replaced with an alternate symbol. In one or more embodiments, each number is replaced with a "#" symbol. Additional embodiments may replace each number with a random number so that an actual account number or account balance cannot be recognized.

In Step 716, n-gram substrings are hashed into a sparse matrix. In one or more embodiments, the message is converted into a set of n-gram substrings. Each n-gram substring includes n characters from the message, where n is at least 2 and in one or more embodiments is 3. In one or more embodiments, one n-gram substring is identified for each string that the message is split into based on white space and punctuation. Each n-gram substring is hashed to form a numerical hash value, which in one or more embodiments is a floating point value. The hash value is loaded into the sparse matrix. The sparse matrix is a compressed matrix, formats of which include compressed sparse column format, compressed sparse row format, block sparse row format, list of lists format, dictionary of keys format, coordinate format, and diagonal format.

In Step 718, the probability of each sender category is predicted. In one or more embodiments, the categorization model predicts the sender category probabilities by inputting the sparse matrix into a neural network that generates an output vector that includes a value for each sender category probability. In one or more embodiments, additional or alternative statistical and machine learning algorithms are used.

In Step 720, a determination is made as to whether one category is clearly more probable. In one or more embodiments, the determination is done by the categorization model by identifying that the sender category probability in the output vector with the highest value is greater than a predefined threshold. When it is unclear that one category is more probable, the process (700) proceeds to Step 722. When one category is clearly more probable, the process (700) proceeds to Step 724.

In Step 722, the message is sent for classification by the user. In one or more embodiments, a request for classification that identifies the message and includes the sender category probabilities is displayed by the user device. The request for classification is generated by the user device when the user device processes the message and is generated by the collection server when the collection server processes the message.

In Step 724, a determination is made as to whether the clearly more probable category is unambiguous. In one or more embodiments, the determination is made by comparing the value of the clearly more probable category to the second highest value in the output vector of category probabilities. When the percent difference between the value of the clearly more probable category and the second highest value is greater than a predetermined threshold, the clearly more probable category is unambiguous. When the clearly more probable category is unambiguous, the process (700) proceeds to Step 710. When the clearly more probable category is ambiguous, the process (700) proceeds to Step 722.

In Step 726, the message is received with a set of messages that have ambiguous senders. In one or more embodiments, the user device receives the set of messages from the collection server.

In Step 728, candidate categories are displayed in order of probability. In one or more embodiments, the set of messages received by the user device includes the output vectors of the sender category probabilities for each message. In one or more embodiments, at least the top two sender category probabilities are included. The user device displays the message with a set of candidate categories. Each candidate category is displayed with a name of the category and the sender category probability that was determined by the categorization model for the candidate category. In one or more embodiments, the top five candidate categories with the highest probabilities are displayed. Additional or alternative embodiments may display only candidate categories with probabilities above a predefined threshold.

In Step 730, an appropriate category for the message is selected. In one or more embodiments, the user device receives the selection as a click event or a tap event that selects one of the candidate categories with the user interface of the user device. When the set of messages includes additional messages that have not been classified, the process (700) repeats back to Step 728. Otherwise, the process (700) proceeds to Step 732.

In Step 732, the roster of manual classifications is approved. In one or more embodiments, the roster of manual classifications is a list that includes a set of items where each item includes the candidate category selected with the user device and the sender address of the message for which the candidate category was selected. In one or more embodiments, the roster is displayed on the user device and the user selects whether to accept the roster. In one or more embodiments, the approved roster is transmitted to the collection server. After approval of the roster, the process (700) proceeds to Step 710.

In Step 734, the message is sent to a database. In one or more embodiments, the collection server sends the message and the assigned category to a database that stores the list of known senders and the set of categories.

In Step 734, the message is sent to a database. In one or more embodiments, the collection server sends the message, the assigned category, and a method identifier to a database that stores the list of known senders and the set of categories. The method identifier identifies the method that was used to categorize the message, which can be one of identification based on a known sender, identification based on an unambiguous probability from the categorization model, and identification based on user selection.

In Step 736, the message is received with a set of messages by the database. In one or more embodiments, database is accessible to and maintained by the collection server.

In Step 738, the category identification is stored. In one or more embodiments the category identification is the category that was assigned to the message.

In Step 740, the method of category identification is stored. In one or more embodiments, collection server stores the method of category identification by saving the method identifier associated with the message to the database.

In Step 742, the process (700) is finished. After storing the category identification and Method identifier to the database, the list of known senders and the set of categories are updated to include the additional associations generated with the categorization model and by the user for subsequent use by the system.

Figure 8:
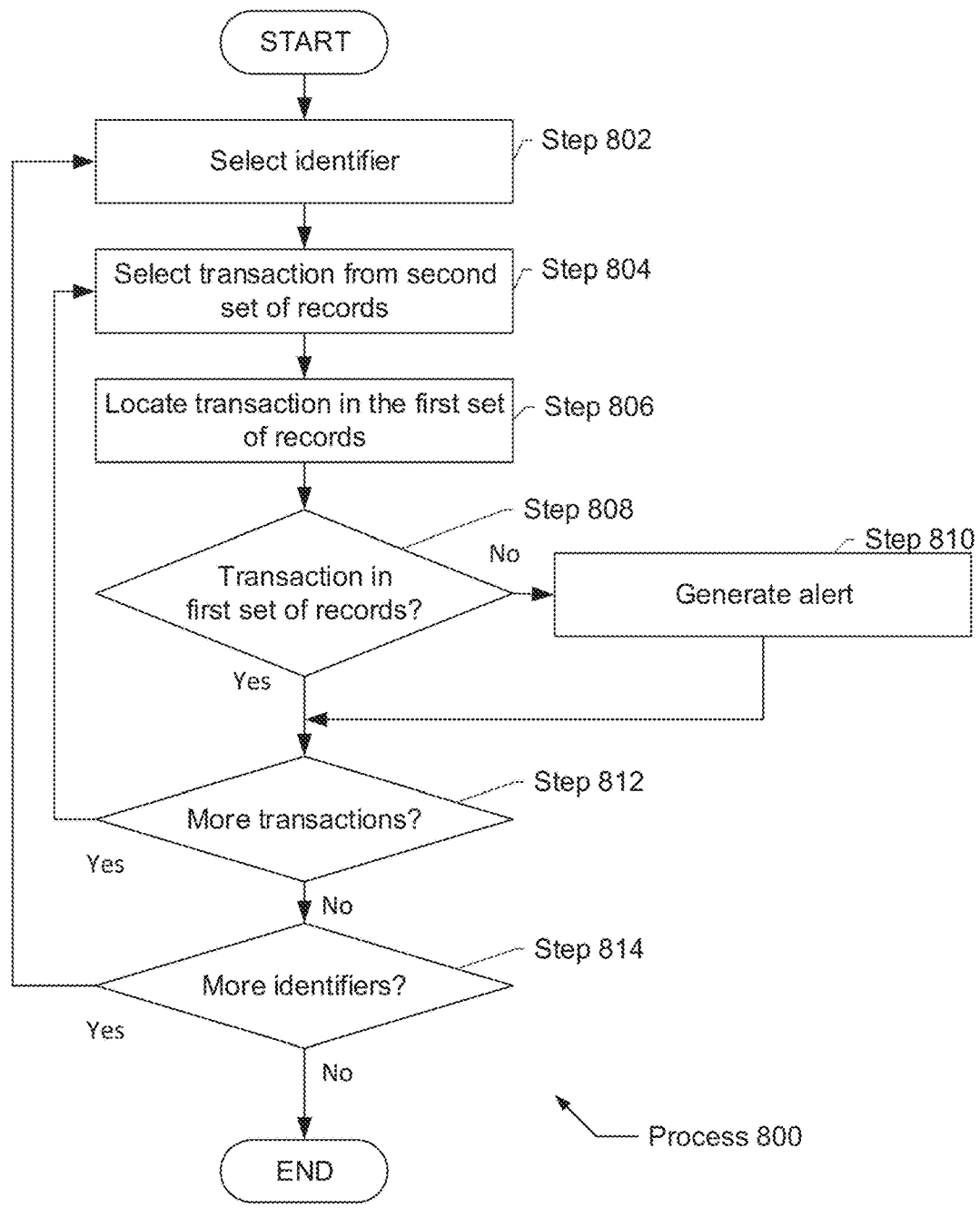
FIG. 8 shows a method for processing records in accordance with one or more embodiments of the present disclosure.

FIG. 8 shows a flowchart in accordance with one or more embodiments of the present disclosure. The flowchart of FIG. 8 depicts a process (800) for determining validity of scraping scripts. The process (800) can be implemented on one or more components of the system (100) of FIG. 1, including the collection server (110). In one or more embodiments, one or more of the steps shown in FIG. 8 may be omitted, repeated, and/or performed in a different order than the order shown in FIG. 8. Accordingly, the scope of the present disclosure should not be considered limited to the specific arrangement of steps shown in FIG. 8.

In one or more embodiments, the process (800) is embodied in accordance with the pseudo code in Table 4 below.

TABLE 4 example pseudo code for the process (800).

| # | Pseudo Code |
|---|---|
| 1 | For every user: |
| 2 | For every recorded transactions last 24 hours in ExternalData (ED) table: |
| 3 | Transaction = Find transaction in WebScrappedData (WSD) table with |
| 4 | WSD.TransactionValue = ED.TransactionValue && |
| 5 | WSD.transaction_type = ED.transaction_type && |
| 6 | WSD.Posted_date - ED.Posted_date <4hours |
| 7 | If (Transaction not found) |
| 8 | Then raise alarm |
| 9 | Else |
| 10 | Continue |
| 11 | End |
| 12 | End |

In Step 802, an identifier is selected. In one or more embodiments, the selected identifier is one of a set of identifiers. Each identifier of the set of identifiers identifies a user of the system. The set of identifiers includes at least a subset of all of the users of the system and is sorted by one or more of a name of the user, an account creation date of the user, an account value of the user, etc. The identifier is selected based on the order of the set of identifiers.

In Step 804, a transaction from the second set of records is selected. In one or more embodiments, the selected transaction is one of a set of transactions that were identified from a set of messages that were generated by one of the account server and the provider server, transmitted using the messaging server, and collected by the collection server. The second set of records were generated from the set of messages by one of the user device and the collection server. The set of transactions is sorted by one or more of a date of the transaction, a time of the transaction, an amount of the transaction, etc. The transaction is selected based on the order of the set of transactions.

In Step 806, the selected transaction is located in the first set of records. The first set of records was generated from data that was scraped from the account server and which may include the selected transaction. The selected transaction is located by matching one or more fields of the transaction to the same fields in one of the first set of records. The code in Table 4 at Line 3 through Line 6 provides one example. The code searches the transactions in the WebScrapedData table for transactions that have the same value as the selected transaction, have the same type as the selected transaction, and where the result from subtracting the posted date of the selected transaction from the posted date of the transaction in the first set or records is less than 4 hours. Additional or alternative embodiments may use different fields and different thresholds.

In Step 808, it is determined if the selected transaction is in the first set of records. In one or more embodiments, the determination based on whether the selected transaction was located in the first set of Records in Step 806. When the selected transaction is not in the first set of records, the process (800) proceeds to Step 810. When the selected transaction is in the first set of records, the process (800) proceeds to Step 812.

In Step 810, an alert is generated. In one or more embodiments, the alert includes a set of values that identify the transaction that was not found in the first set of records, identify the scraping script that was used to generate the first set of records, identify when the scraping script was executed, identify when the first set of records were generated, identify the selected transaction that was not found, and identify the date and time that the first set of records were searched for the selected transaction.

In Step 812, it is determined if there are more transactions. In one or more embodiments, the process (800) determines if the second set of records includes additional transactions that have not been searched for in the first set of records. When there are additional transactions, the process (800) repeats back to Step 804. When there are no additional transactions, the process (800) proceeds to Step 814.

In Step 814, it is determined if there are more identifiers. In one or more embodiments, the process (800) determines if the set of identifiers that identify the users of the system (100) includes additional identifiers that have not been processed. When there are additional identifiers, the process (800) repeats back to Step 802. When there are no additional identifiers, the process (800) ends.

Figure 9A:
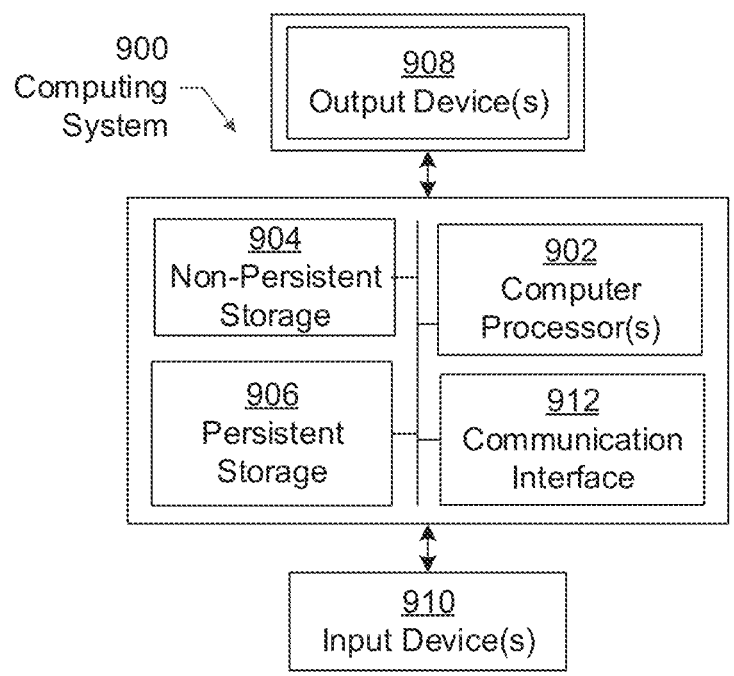
FIGS. 9A and 9B show a computing system in accordance with one or more embodiments of the invention.

Embodiments of the invention may be implemented on a computing system. Any combination of mobile, tablet, desktop, server, router, switch, embedded device, or other types of hardware may be used. For example, as shown in FIG. 9A, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 9B:
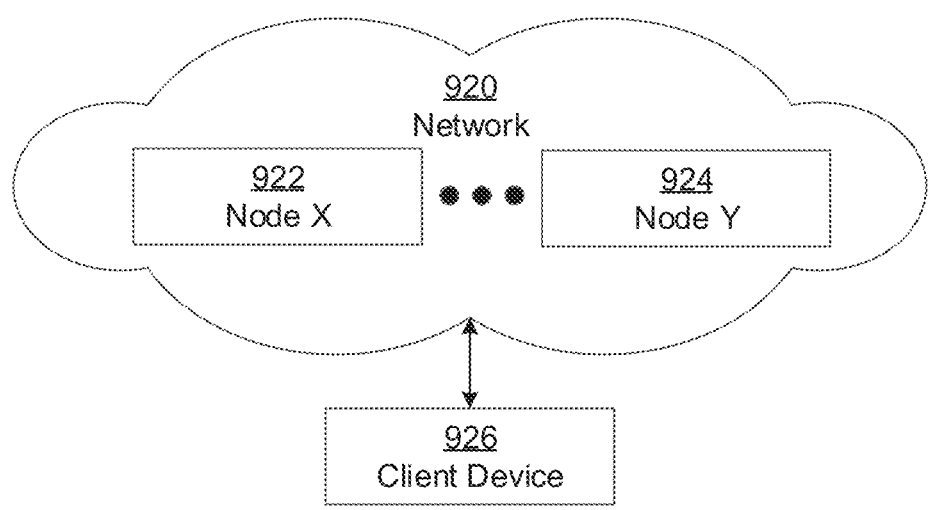

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9A. Further, the client device (926) may include and/or perform all or a portion of one or more embodiments of the invention.

The computing system or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, which may be in accordance with the extensible markup language (XML) standard).

The extracted data may be used for further processing by the computing system. For example, the computing system of FIG. 9A, while performing one or more embodiments of the invention, may perform data comparison. Data comparison may be used to compare two or more data values (e.g., A, B). For example, one or more embodiments may determine any combination of A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various widgets and elements that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 9A and the nodes and/or client device in FIG. 9B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    establishing a network connection with a plurality of servers executing at least one web application;
    executing, via the network connection, a set of computer executable scraping instructions on the at least one web application to obtain a set of scraped data from an account server;
    receiving a plurality of electronic messages transmitted via a network from at least one of a messaging server and a collection application;
    generating a first set of records from the set of scraped data from the account server;
    generating a second set of records from the plurality of electronic messages from the at least one of the messaging server and the collection application;
    validating the set of computer executable scraping instructions to obtain a validation result, wherein the validating includes locating a transaction in the second set of records that is missing in the first set of records; and
    generating, based on the validation result, an alert to update the set of computer executable scraping instructions.

2. The method of claim 1, wherein generating the first set of records comprises:
    receiving a set of scraped data;
    identifying a transaction of a set of transactions in the set of scraped data,
        wherein the transaction includes transaction data in the set of scraped data;
    identifying a set of values in the transaction data,
        wherein the set of values are mapped to a set of fields for the first set of records,
        wherein the set of values includes values for a transaction type, a transaction amount, a transaction description, a transaction date, and a transaction balance;
    sorting the transaction within the set of transactions,
        wherein the transaction is sorted by a transaction date of the transaction;
    determining a running balance for the transaction by:
        identifying a starting balance for the transaction;
        combining the starting balance with a transaction amount for the transaction to generate the running balance for the transaction;
        wherein the running balance is mapped to a field in the set of fields; and
    storing the set of values and the running balance in a first set of fields of a first record of the first set of records.

3. The method of claim 1, wherein generating the second set of records comprises:
    selecting a message of the plurality of electronic messages that includes an address and a body;
    classifying the address with a set of categories by:
        comparing the address to a list of known addresses;
        assigning a category of the set of categories to the address when the address matches a known address in the list of known sender addresses,
            wherein the category is previously associated with the known sender address;
    classifying a message type based on the body by:
        identifying a keyword in the body;
    classifying an entity type based on the body by:
        identifying a group of numbers within the body; and
        identifying a relative location of the group of numbers with respect to an entity identifier within the body.

4. The method of claim 1, further comprising:
    selecting a first identifier of a set of identifiers before validating the set of computer executable scraping instructions;
    selecting the transaction in the second set of records before validating the set of computer executable scraping instructions;
    selecting an additional transaction from the second set of records to process when the second set of records includes the additional transaction; and
    selecting an additional identifier to process when the set of identifiers includes the additional identifier.

5. The method of claim 1, further comprising:
    transmitting the alert to a developer device;
    receiving an instruction from the developer device that is based on the alert; and
    executing the instruction.

6. The method of claim 1, further comprising:
    receiving the plurality of electronic messages from the messaging server.

7. The method of claim 1, further comprising:
    receiving the plurality of electronic messages from the collection application, which was delivered to a user device.

8. A system, comprising:
a computer processor;
a memory;
a set of instructions in the memory that when executed by the computer processor cause the computer processor to perform the steps of:
 establishing a network connection with a plurality of servers executing at least one web application;
 executing, via the network connection, a set of computer executable scraping instructions on the at least one web application to obtain a set of scraped data from an account server;
 receiving a plurality of electronic messages transmitted via a network from at least one of a messaging server and a collection application;
 generating a first set of records from the set of scraped data from the account server;
 generating a second set of records from the plurality of electronic messages from the at least one of the messaging server and the collection application;
 validating the set of computer executable scraping instructions to obtain a validation result, wherein the validating includes locating a transaction in the second set of records that is missing in the first set of records; and
 generating, based on the validation result, an alert to update the set of computer executable scraping instructions.

9. The system of claim 8, wherein the instructions for generating the first set of records further cause the processor to perform the steps of:
 receiving a set of scraped data;
 identifying a transaction of a set of transactions in the set of scraped data,
  wherein the transaction includes transaction data in the set of scraped data;
 identifying a set of values in the transaction data,
  wherein the set of values are mapped to a set of fields for the first set of records,
  wherein the set of values includes values for a transaction type, a transaction amount, a transaction description, a transaction date, and a transaction balance;
 sorting the transaction within the set of transactions,
  wherein the transaction is sorted by a transaction date of the transaction;
 determining a running balance for the transaction by:
  identifying a starting balance for the transaction;
  combining the starting balance with a transaction amount for the transaction to generate the running balance for the transaction;
  wherein the running balance is mapped to a field in the set of fields; and
 storing the set of values and the running balance in a first set of fields of a first record of the first set of records.

10. The system of claim 8, wherein the set of instructions for generating the second set of records further cause the processor to perform the steps of:
 selecting a message of the plurality of electronic messages that includes an address and a body;
 classifying the address with a set of categories by:
  comparing the address to a list of known addresses;
  assigning a category of the set of categories to the address when the address matches a known address in the list of known sender addresses,
   wherein the category is previously associated with the known sender address;
 classifying a message type based on the body by:
  identifying a keyword in the body;
 classifying an entity type based on the body by:
  identifying a group of numbers within the body; and
  identifying a relative location of the group of numbers with respect to an entity identifier within the body.

11. The system of claim 8, wherein the set of instructions further cause the processor to perform the steps of:
 selecting a first identifier of a set of identifiers before validating the set of computer executable scraping instructions;
 selecting the transaction in the second set of records before validating the set of computer executable scraping instructions;
 selecting an additional transaction from the second set of records to process when the second set of records includes the additional transaction; and
 selecting an additional identifier to process when the set of identifiers includes the additional identifier.

12. The system of claim 8, wherein the set of instructions further cause the processor to perform the steps of:
 transmitting the alert to a developer device;
 receiving an instruction from the developer device that is based on the alert; and
 executing the instruction.

13. The system of claim 8, wherein the set of instructions further cause the processor to perform the step of:
 receiving the plurality of electronic messages from the messaging server.

14. The system of claim 8, wherein the set of instructions further cause the processor to perform the step of:
 receiving the plurality of electronic messages from the collection application, which was delivered to a user device.

15. A non-transitory computer readable medium comprising computer readable program code for:
 establishing a network connection with a plurality of servers executing at least one web application;
 executing, via the network connection, a set of computer executable scraping instructions on the at least one web application to obtain a set of scraped data from an account server;
 receiving a plurality of electronic messages transmitted via a network from at least one of a messaging server and a collection application;
 generating a first set of records from the set of scraped data from the account server;
 generating a second set of records from the plurality of electronic messages from the at least one of the messaging server and the collection application;
 validating the set of computer executable scraping instructions to obtain a validation result, wherein the validating includes locating a transaction in the second set of records that is missing in the first set of records; and
 generating, based on the validation result, an alert to update the set of computer executable scraping instructions.

16. The non-transitory computer readable medium of claim 15, wherein the computer readable program code for generating the first set of records further comprises computer readable program code for:
 receiving a set of scraped data;
 identifying a transaction of a set of transactions in the set of scraped data,
  wherein the transaction includes transaction data in the set of scraped data;

identifying a set of values in the transaction data,
  wherein the set of values are mapped to a set of fields for the first set of records,
  wherein the set of values includes values for a transaction type, a transaction amount, a transaction description, a transaction date, and a transaction balance;
sorting the transaction within the set of transactions,
  wherein the transaction is sorted by a transaction date of the transaction;
determining a running balance for the transaction by:
  identifying a starting balance for the transaction;
  combining the starting balance with a transaction amount for the transaction to generate the running balance for the transaction;
  wherein the running balance is mapped to a field in the set of fields; and
storing the set of values and the running balance in a first set of fields of a first record of the first set of records.

17. The non-transitory computer readable medium of claim 15, wherein the computer readable program code for generating the second set of records further comprises computer readable program code for:
classifying the address with a set of categories by:
  comparing the address to a list of known addresses;
  assigning a category of the set of categories to the address when the address matches a known address in the list of known sender addresses,
    wherein the category is previously associated with the known sender address;
classifying a message type based on the body by:
  identifying a keyword in the body;
classifying an entity type based on the body by:
  identifying a group of numbers within the body; and
  identifying a relative location of the group of numbers with respect to an entity identifier within the body.

18. The non-transitory computer readable medium of claim 15, further comprising computer readable program code for:
selecting a first identifier of a set of identifiers before validating the set of computer executable scraping instructions;
selecting the transaction in the second set of records before validating the set of computer executable scraping instructions;
selecting an additional transaction from the second set of records to process when the second set of records includes the additional transaction; and
selecting an additional identifier to process when the set of identifiers includes the additional identifier.

19. The non-transitory computer readable medium of claim 15, further comprising computer readable program code for:
transmitting the alert to a developer device;
receiving an instruction from the developer device that is based on the alert; and
executing the instruction.

20. The non-transitory computer readable medium of claim 15, further comprising computer readable program code for:
receiving the plurality of electronic messages from one or more of the messaging server and the collection application, which was delivered to a user device.

* * * * *